(12) United States Patent
Kim et al.

(10) Patent No.: US 8,059,956 B2
(45) Date of Patent: Nov. 15, 2011

(54) AUTO FOCUS APPARATUS AND METHOD FOR CAMERA

(75) Inventors: Sung-Hoon Kim, Seoul (KR); Yong-Gu Lee, Bucheon-si (KR); Doo-Sik Shin, Suwon-si (KR); Yeon-Jun Lee, Suwon-si (KR)

(73) Assignee: Samsung Electronics Co., Ltd., Maetan-dong, Yeongtong-gu, Suwon-si, Gyeonnggi-do (KR)

( * ) Notice: Subject to any disclaimer, the term of this patent is extended or adjusted under 35 U.S.C. 154(b) by 290 days.

(21) Appl. No.: 12/123,563

(22) Filed: May 20, 2008

(65) Prior Publication Data

US 2008/0317452 A1    Dec. 25, 2008

(30) Foreign Application Priority Data

Jun. 19, 2007  (KR) .................. 10-2007-0059886
Aug. 30, 2007  (KR) .................. 10-2007-0087650

(51) Int. Cl.
*G03B 13/36*    (2006.01)
(52) U.S. Cl. ........... 396/127; 396/93; 396/133; 348/356
(58) Field of Classification Search .............. 396/93, 396/133
See application file for complete search history.

(56) References Cited

U.S. PATENT DOCUMENTS

| | | | | |
|---|---|---|---|---|
| 5,895,129 A * | 4/1999 | Ohta | ................................ | 396/79 |
| 5,966,550 A | 10/1999 | Oono et al. | ................... | 396/82 |
| 6,118,945 A * | 9/2000 | Tanaka | .............................. | 396/79 |
| 6,885,819 B2 * | 4/2005 | Shinohara | ..................... | 396/127 |
| 2006/0078323 A1* | 4/2006 | Nakahara | ...................... | 396/127 |
| 2006/0119732 A1* | 6/2006 | Ohta | .............................. | 348/347 |
| 2007/0201848 A1* | 8/2007 | Taguchi | .......................... | 396/55 |
| 2007/0280666 A1* | 12/2007 | Nakahara | ..................... | 396/125 |
| 2008/0219655 A1* | 9/2008 | Yoon et al. | .................... | 396/127 |
| 2009/0060487 A1* | 3/2009 | Lee et al. | ...................... | 396/104 |
| 2009/0085558 A1* | 4/2009 | David et al. | ............... | 324/207.2 |

FOREIGN PATENT DOCUMENTS

| | | |
|---|---|---|
| CN | 1444391 | 9/2003 |
| EP | 1463305 A1 | 9/2004 |
| JP | 2003-333411 | 11/2003 |
| JP | 2004-048446 | 2/2004 |

* cited by examiner

*Primary Examiner* — Clayton E Laballe
*Assistant Examiner* — Bret Adams
(74) *Attorney, Agent, or Firm* — Cha & Reiter, LLC

(57) ABSTRACT

An auto focus (AF) apparatus and method for a camera that improves the AF action by reducing the number of time and steps required of a conventional apparatus and method. An encoder initial value is detected by measuring an initial position of a lens unit by means of an encoder; matching the measured encoder initial value to an initial position value to which the lens unit is to move while performing the auto focus; performing the auto focus starting from the matched initial position value, and dividing a distance that the lens unit is to cover into sections corresponding to a preset number of steps; detecting an edge value which shows a brightness change for a contour of a subject for as many as the number of the preset steps. The AF is completed by moving the lens unit to a position corresponding to a maximum edge value selected from among the detected edge values.

19 Claims, 8 Drawing Sheets

AUTO FOCUS APPARATUS AND METHOD FOR CAMERA

CLAIM OF PRIORITY

This application claims the benefit of priority under 35 U.S.C. §119(a) of an application entitled "Auto Focus Apparatus and Method for Camera" filed in the Korean Intellectual Property Office on Jun. 19, 2007 and assigned Serial No. 2007-59886 and an application entitled the same filed with the Korean Intellectual Property Office on Aug. 30, 2007 and assigned Serial No. 2007-87650, the contents of both are hereby incorporated by reference in their entirety.

BACKGROUND OF THE INVENTION

1. Field of the Invention

The present invention relates to a camera. More particularly the present invention relates to an auto focus apparatus and its movement thereof, as well as a method for using an encoder in a camera.

2. Description of the Related Art

A common camera typically includes a lens system for forming an image of a subject on a film or on a surface of an image sensor, and an image sensor for detecting the image, formed by the lens system, in the form of an electric signal. The film or the surface of an image sensor is constructed to correspond to an image surface of the lens system. A focus position of the lens system changes according to a distance between a lens and a subject. Accordingly, only when a quantity of change of the image surface position according to a position of a subject falls within a range of depth of focus of the camera, can a picture having a good quality be photographed. In other words, in order to acquire clear images, a light-receiving surface of the image sensor must be located within the range of the depth of focus of the lens system.

Accordingly, an apparatus must be provided for the camera, which enables the position of a lens to be moved according to a distance between a subject and a common camera, especially for a camera having a macro function having a large amount of change of a focus position according to the change of a distance from a subject. More particularly, a camera having a macro function having a large amount of change in focus position such as a function for close-up photographing. A camera having a means for automatically adjusting a position relative to a subject is referred to in the art as an Auto Focus (AF) camera.

In such an AF camera, methods for judging an exact focus interval between a subject located at a specific distance and a lens include a method for measuring the distance between the camera and the subject, and a method for estimating a focus position by analyzing a preview image. Recently manufactured compact digital cameras generally use the latter method. A method for estimating a focus position by analyzing a preview image will now be described herein below with reference to a block diagram shown in FIG. 1.

FIG. 1 schematically illustrates an internal structure of a conventional AF camera. A lens unit 110, an image sensor 120, a driving unit 130, an image signal processor (ISP) 140, a display unit 150 and a control unit 160 are included as internal components of the conventional AF camera.

Still referring to FIG. 1, the lens unit 110 optically receives an image of a subject, and includes at least one lens 112. The image sensor 120 converts the image of a subject which has been optically received by the lens unit 110 into electric signals. The ISP 140 processes the electric signals input from the image sensor 120 in units of frames, and outputs the image frame which has been converted in such a manner as to be appropriate to the screen characteristic (i.e., size, image quality, resolution, etc.) of the display unit 150. The display unit 150 displays the image frames which have been input from the ISP 140, on the screen. The driving unit 130 moves the lens unit 110 according to the control of the control unit 160, and includes a motor (M) 132 providing a driving force and a carrier 134 moving the lens unit 110 forward and backward by the driving force. The control unit 160 controls the driving unit 130 and moves the lens unit 110 to the focus position.

An auto focus process for estimating a focus position by analyzing a preview image through use of the components of FIG. 1 mentioned above will now be described herein below.

First, the lens unit 110 is moved to a starting point. A subject is photographed at the starting point, and then an image frame is formed by the image sensor 120. An edge value, which has usually been set at the central part of a screen, within an AF window is extracted from the image frame, and then the focus characteristic of the starting point is detected. Herein, an "edge" corresponds to the contour of the subject and to a boundary in which the brightness on the image frame rapidly changes. The edge value represents the difference brightness of such an "edge". The brightness of each pixel of the image sensor 120 is calculated and a standard value is compared with the brightness difference between two adjacent pixels with respect to the row and column directions of the image sensor 120, and then it is determined whether the boundary between the two pixels is the edge. Such an edge value is calculated by accumulatively adding the brightness differences of the pairs of pixels corresponding to the edge.

After calculating the edge value, there is an identification as to whether or not the location of the lens unit 110 corresponds to an end point. When the lens unit 110 is not located at the end point, the lens unit 110 is subsequently moved to the next position, and then the operations mentioned above are repeatedly performed in succession. When the lens unit 110 is located at the end point, the maximum edge value among the edge values resulting from the above-mentioned repetitive processes is determined. Then, the lens unit 110 is moved to a position corresponding to the maximum edge value, and the AF process is completed. Consequently, the subject can then be photographed in a state where the focus has been automatically adjusted.

With regard to the AF performance processing described above, the motor of the driving unit provides movement of the position of a lens in accordance with commands from the control unit 160. The types of motors used in the driving unit include a Voice Coil Motor (VCM) and a Piezo Linear Motor (PLM), etc. The VCM is main type of motor used for AF. The VCM is advantageous to providing accurate linear motion because of its quick response characteristic, and the VCM is advantageous for miniaturization and precise location control owing to its relatively long stroke distance. The VCM operates in such a manner as to change the position of the lens by applying a current to the coil of the VCM having a characteristic as mentioned above.

In such a VCM, currents for driving each VCM commonly have slightly different values. For the purpose of an exact AF, though it is the most ideal to manufacture an AF camera that suitably corresponds to each different VCM driving current value, such a method often requires a large amount of cost and time in an attempt to provide a desired result. For that reason, there arises a problem in increasing the manufacturing yield.

In order to increase the manufacturing yield, manufacturers will apply the minimum current value among VCM driving current values to the VCM within the range established in the manufacturing process, instead of manufacturing an AF camera in accordance with each corresponding individual VCM driving current value. Through the process mentioned above, one VCM driving current value is applied to VCMs having different driving current values that does not result in an optimum design. As each VCM has no current value optimized thereto, an AF step not used for the actual AF driving is generated according to the AF camera module, which produces an increase in the AF driving time. An example of the description is illustrated in the graph of FIG. 2 below.

FIG. 2 illustrates the position of the lens unit which has moved to the point which is equivalent to each current value when a specific driving current value for moving the lens is applied to a VCM in the AF camera module to which VCM driving current value established on the conventional manufacturing process is applied.

Referring to FIG. 2, since an A, i.e., a first AF start step, and an A+Δ, i.e., a second AF step, have the same position of lens (0), an AF time is delayed by 1 step. That is, the VCM cannot have an optimized driving current value because of the VCM driving current value established on the manufacturing process and thus, it is noted that the A, i.e., the first AF start step is an unnecessary step not used for actual AF driving. Since the lens usually returns to the originally set position after AF, the unnecessary step mentioned above is continuously performed.

The result of the unnecessary step mentioned above is that there occurs a problem that time required for searching the maximum edge value increases because of the need to perform an unused step. In order to address the problem, there is has been a long felt need in the art for an AF method guaranteeing the rapid AF operation characteristic of an AF camera regardless of the VCM driving current value of the motor of individual driving unit.

SUMMARY OF THE INVENTION

Accordingly, the present invention has been made to solve in part at least some of the above-mentioned problems occurring in the prior art, and to provide at least the advantages described herein below. The present invention provides an apparatus and method for performing an auto focus only through a step of minimum movement for auto focus by starting an auto focus driving at a certain position irrespective of change of the driving current value of each driving unit, and for guaranteeing the rapid operation characteristic of an auto focus camera by reducing the driving time for the auto focus.

In accordance with an exemplary aspect of the present invention, there is provided an auto focus method in a camera, the method typically including the steps of: detecting an encoder initial value by measuring an initial position of a lens unit by means of an encoder; matching the measured encoder initial value to an initial position value to which the lens unit is to move while performing the auto focus; performing the auto focus starting from the matched initial position value, and dividing a distance that the lens unit is to cover/move into sections corresponding to a preset number of steps; detecting an edge value, which shows a brightness change for a contour of a subject, according to each of the preset steps; and completing the auto focus by moving the lens unit to a position corresponding to the edge value having a maximum brightness change for the contour of the subject from among the detected edge values.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, embodiment(s) of the present invention will be described with reference to the accompanying drawings. In the following description, details, such as examples of specific constituent elements, are shown. However, these examples are provided only for illustrative purposes and the invention is not in any way limited in scope to the examples shown and described herein. A person of ordinary skill in the art understands and appreciates that modifications or changes may be made to the examples that are within the spirit of the present invention and the scope of the appended claims. As the specification is provided for understanding by a person of ordinary skill in the art, a description of known structures and processes may be omitted where appropriate so as not to obscure appreciation of the subject matter of the present invention.

As described in the related art, there has been a long-standing problem that a Voice Coil Motor (VCM) cannot have an optimized driving current value, and an auto focus (AF) driving time is wasted such that the AF driving time increases when the minimum current value among VCM driving current values determined on the existing manufacturing process is collectively applied to all the VCMs.

Accordingly, for the purpose of solving the long-standing problem described in the art, the present invention provides a new method for performing an AF only through the minimal number of AF steps without wasting AF driving time by starting an AF driving at a certain position irrespective of change of the VCM driving current value. Hereinafter, the method will be described in detail with reference to views illustrating an internal structure of the present invention and graphs showing each embodiment.

Figure 1:
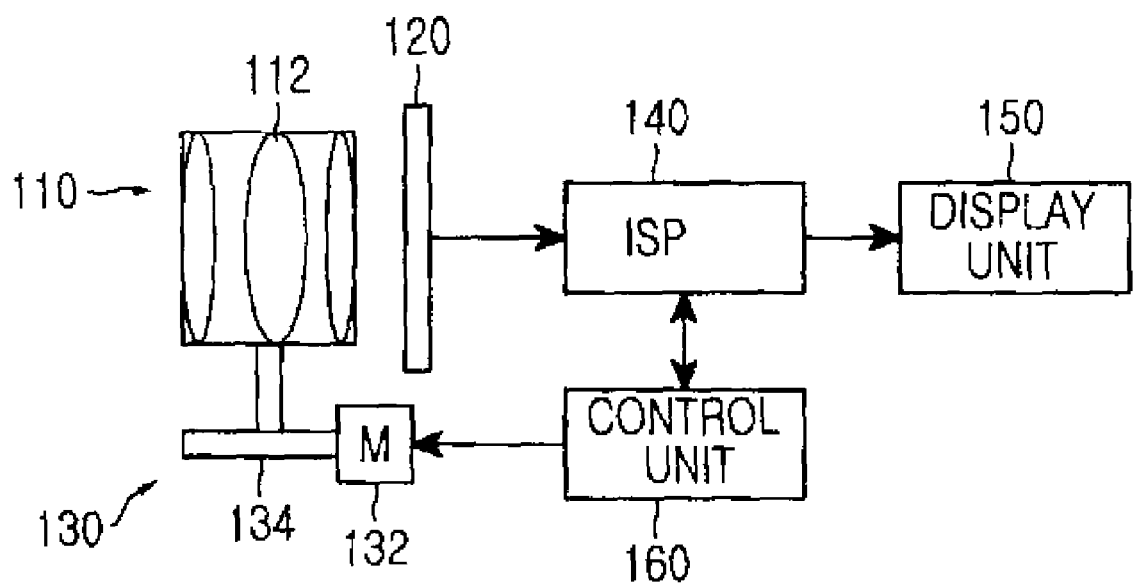
FIG. 1 is a view illustrating an internal structure of a conventional auto focus camera.
Figure 2:
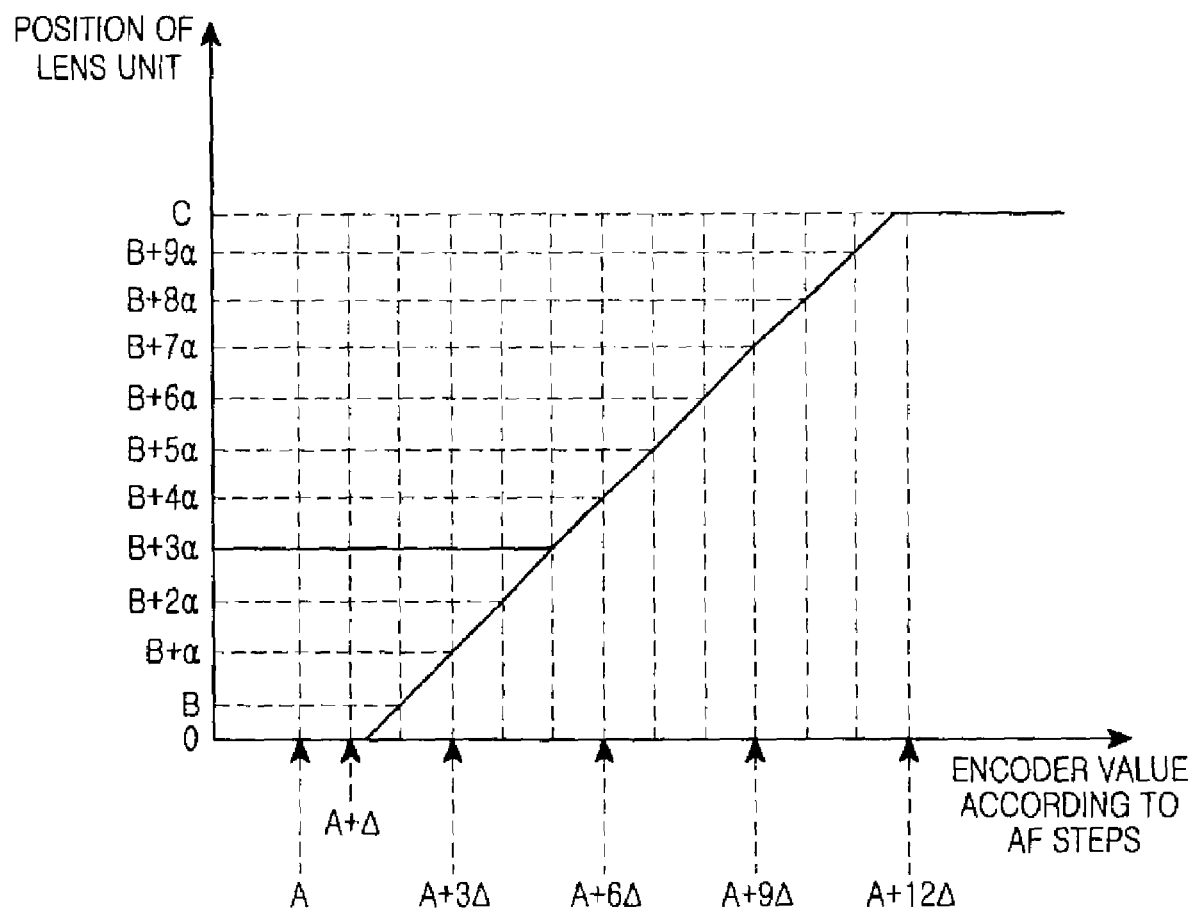
FIG. 2 is a graph illustrating the position of a lens unit which has moved to the point which is equivalent to each current value when a specific driving current value for moving a lens is applied to a VCM in an AF camera module to which VCM driving current value established on the conventional manufacturing process is applied.
Figure 3A:
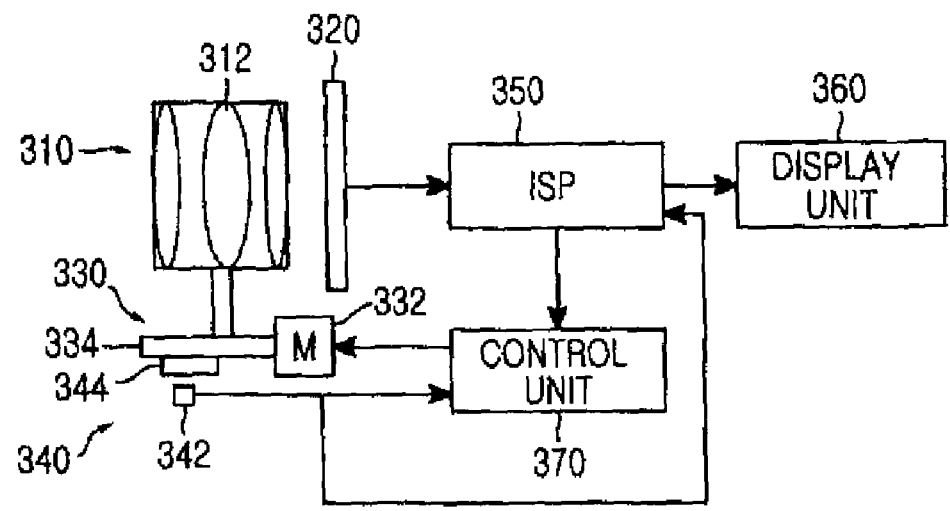
FIGS. 3A and 3B are views illustrating an internal structure of an auto focus camera including an encoder according to an exemplary embodiment of the present invention.
Figure 3B:
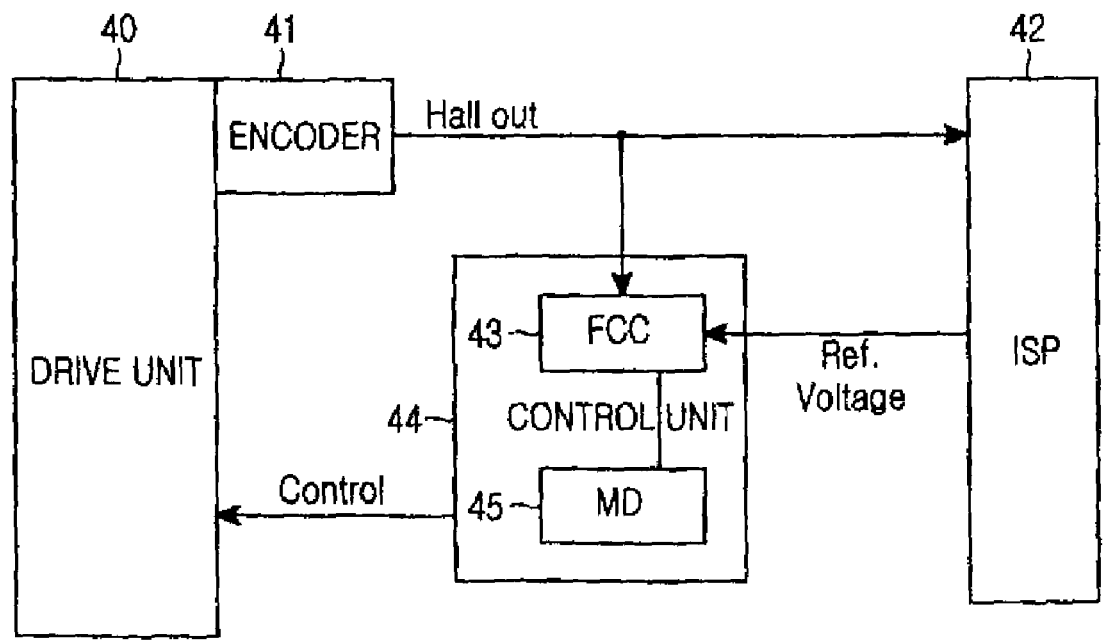

FIG. 3 illustrates an internal structure of an auto focus camera including an encoder according to an exemplary embodiment of the present invention. The encoder in the view illustrating the internal structure of FIG. 3 is included as a component of a driving unit. The overall internal structure of an AF camera is shown in FIG. 3A, and the components of the AF camera, i.e., a driving unit, an image signal processor and a control unit are shown in more detail in FIG. 3B.

Referring to the exemplary components illustrated in FIG. 3A, the AF camera may include a lens unit 310, an image sensor 320, a driving unit 330, an image signal processor (ISP) 350, a display unit 360, a control unit 370 and an encoder 340.

The lens unit 310 forms an image of a subject and includes at least one lens 312. The lens 312 may be configured as a convex lens, a concave lens, an aspheric lens and/or the like. The lens unit 310 may have rotational symmetry for an optical axis. The optical axis may be defined as an axis passing through one lens or an apex of a plurality of lenses.

The image sensor 320 detects the image formed by the lens unit 310 in the form of an electric signal. The ISP 350 processes the actual image signal transmitted from the image sensor 320 frame by frame and converts the signal in such a manner as to be appropriate to the screen characteristic (i.e., a size, an image quality and a resolution, etc.) of the display unit 360, and then transmits the image frame to the display unit 360. A Charge Coupled Device (CCD) image sensor or a Complementary Metal Oxide Semiconductor (CMOS) image sensor, etc. may be used, for example, as the image sensor 320. The display unit 360 displays on the screen the image frame input from the ISP 350.

The control unit 370 controls the driving unit 330 and moves the lens unit 310 to a specific focus position. The control unit 370 typically includes a feedback control circuit and a driver in combination. The driving unit 330 moves the lens unit 310 according to the control of the control unit 370, and includes a motor 332 providing a driving force and a carrier 334 for moving the lens unit 110 forward and backward along the optical axis by the driving force.

The encoder 340 detects the position of the lens unit 310 and outputs a position detection signal representing the position to the control unit 370. The encoder 340 may be commonly implemented through a combination of, for example, a Hall Sensor 342 and a permanent magnet 344. The Hall sensor 342 is disposed in the lower part of the carrier 334 and detects the position change of the lens unit 310. The output voltage of the Hall sensor 342 varies according to the intensity of the magnetic field applied by the permanent magnet 344. The control unit 370 detects the position of the lens unit 310 on the basis of the voltage of position detection signal input from the Hall sensor 342.

The process of performing the AF will be described with reference to arrows illustrated in FIG. 3B while a focus is laid on the encoder 340 and the control unit 370 among the aforementioned components in FIG. 3A. The value output from each process will be shown in the graph below.

In FIG. 3B, the process of AF performance may be illustrated with regard to three processes below centering on the encoder 41 including the Hall sensor, and on the control unit 44 for controlling the driving unit by detecting whether or not an actual lens has moved.

In a first step, an ISP 42 receives an encoder initial value showing the initial position value of the lens from the encoder 41. After receiving the position value of the lens from the encoder 41, the ISP 42 sets an initial value for the AF step and an encoder value according to each AF step by using the received encoder initial value, and transmits the values as a reference voltage value to the control unit 44.

Herein, with regard to this exemplary embodiment the encoder initial value refers to a value for always setting the position of the lens in the initial auto focus step to "0" determining the position where the lens starts to move by action of the driving unit and for allowing the auto focus step to always start at a certain position.

With regard to the present invention, the encoder initial value is not a fixed value and may vary depending on the locking type or position of the corresponding lens unit, and/or the characteristic of the Hall sensor and the like. By using such a characteristic of the encoder initial value, a graphical illustration of the position values of the lens unit in the VCM in which encoder initial values i.e., E1, E2 and E3 are mutually different is shown in FIG. 4 below.

Figure 4:
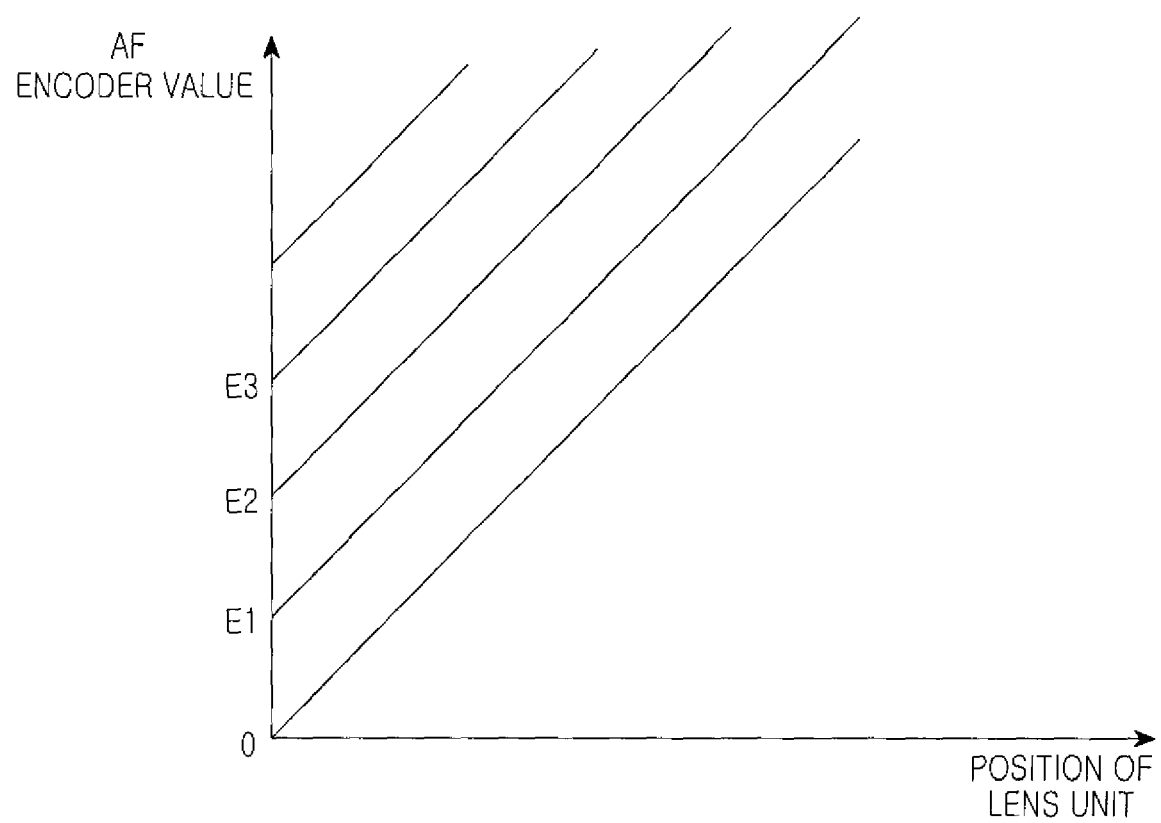
FIG. 4 is a graph illustrating a position value of the lens unit according to an encoder value on the auto focus process according to an exemplary embodiment of the present invention.

FIG. 4 illustrates a position value of the lens unit according to an encoder value on the auto focus process according to an exemplary embodiment of the present invention.

Referring to FIG. 4, the encoder initial values of each VCM of the driving unit are expressed in the order of E1, E2 and E3, respectively. This shows that the initial value may vary according to the individual variations of each respective VCM.

In a second step, the feedback control circuit 43 of the control unit 44 receives from the encoder 41 the value of the actual travel distance of the lens by each step, including the encoder initial value. After receiving the value of the actual travel distance, the feedback control circuit 43 compares, according to the corresponding steps, the AF encoder value received from the ISP 42 with the value of actual travel distance of the lens, generates a control signal for controlling the drive unit 40, and then linearizes the control signal by the addition and subtraction of actual travel distance of the lens on the basis of the AF encoder value received from the ISP 42. Such a linearized control signal is transmitted from the feedback control circuit 43 to the motor driver 45 of the control unit 44. After receiving, the motor driver 45 controls the driving unit 40 and linearly moves the position of the lens unit by each step, which is illustrated in FIG. 5 below.

Figure 5:
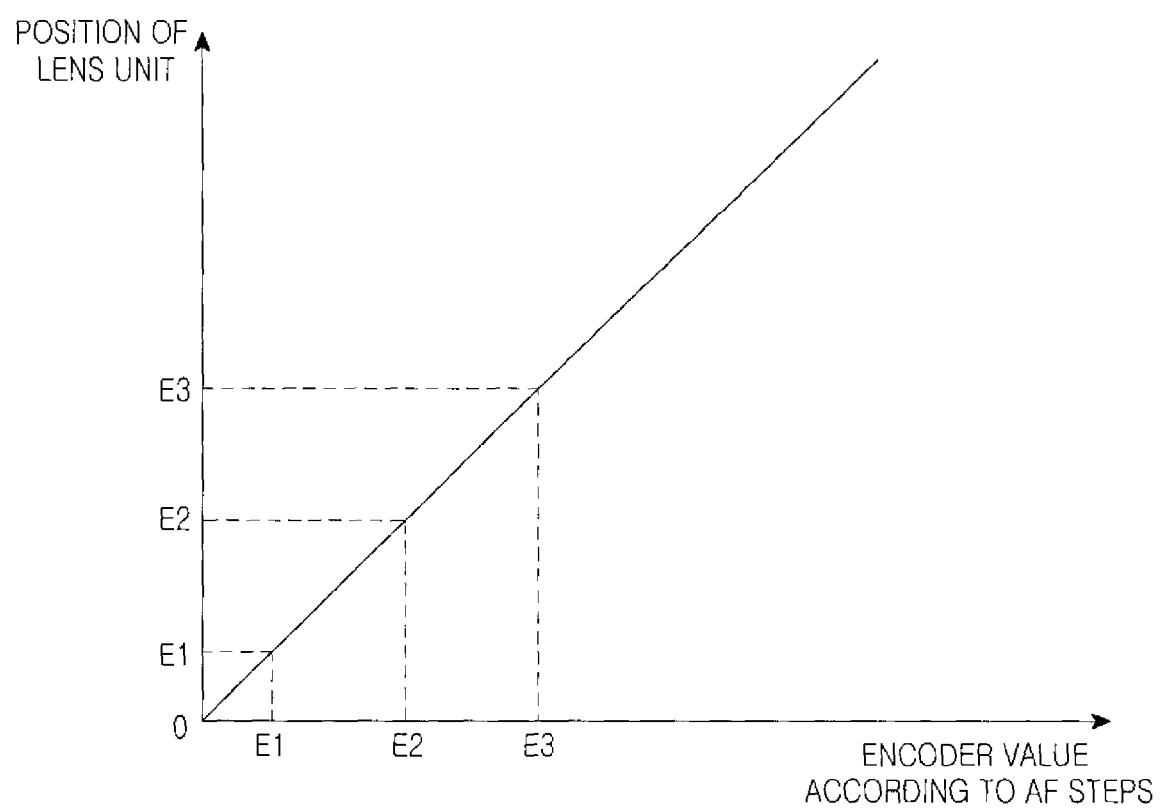
FIG. 5 is a linear graph illustrating that a scaling factor of the position of the lens unit to an encoder value by each step is "1" in the auto focus camera according to an exemplary embodiment of the present invention.

FIG. 5 illustrates a linear graph showing that a scaling factor of the position of the lens unit to an encoder value by each step is "1" in the auto focus camera according to an exemplary embodiment of the present invention.

Referring to FIG. 5, due to the position of the linearly controlled driving unit, an encoder value by corresponding step, i.e., E1 for the position value of the lens unit, i.e., E1 is created. The same is true of E2 and E3.

Finally, in a third step, the VCM of the driving unit 40 performs an AF by moving the position of a lens. The process of performing the AF according to the encoder value by each step based on the present invention is shown in the graphs of FIGS. 6A and 6B below.

Figure 6A:
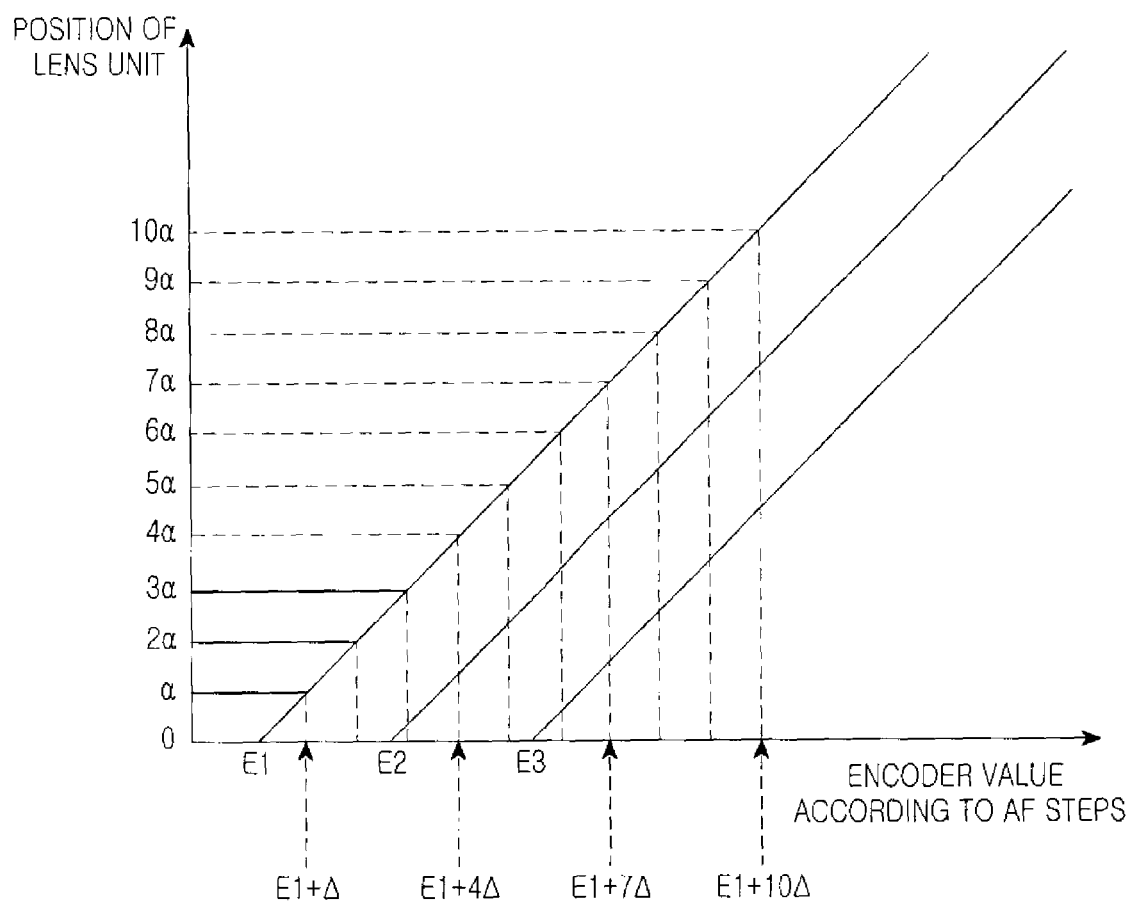
FIGS. 6A and 6B are graphs illustrating a time required for the auto focus by using an initial value of the encoder according to first and second embodiments of the present invention.
Figure 6B:
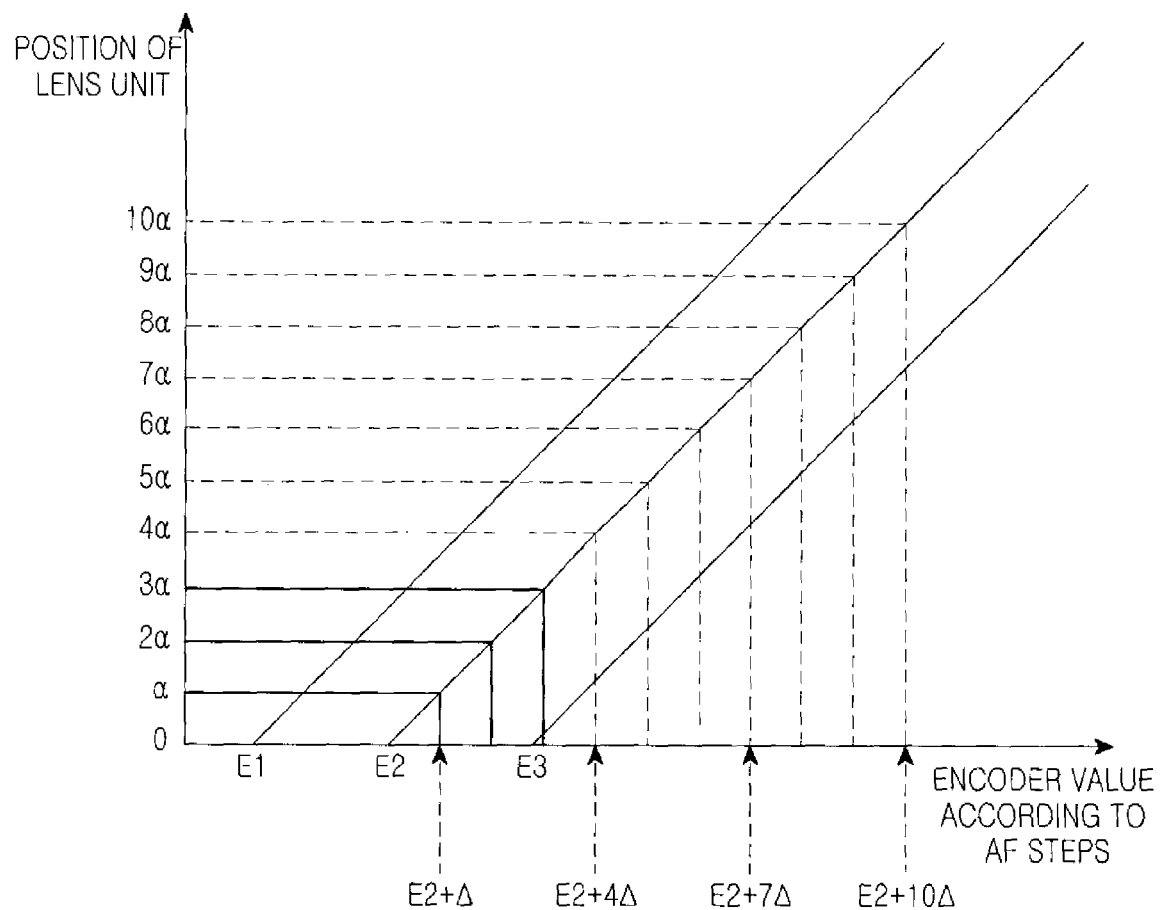

FIGS. 6A and 6B illustrates graphs showing a time required for the auto focus by using an initial value of the encoder according to respective first and second embodiments of the present invention. The AF is performed only by the minimum numbers of AF step in FIGS. 6A and 6B.0

In FIG. 6A, for this particular exemplary embodiment it shall be assumed that an encoder initial value of the driving unit is E1. Since the encoder initial value of the corresponding driving unit can be known before starting AF, the encoder value of the first AF step is set to E1. As a result, the position of a carrier is 0 as illustrated in the graph. That is, the driving unit does not drive until the encoder value becomes E1.

If the encoder value of the second AF step is set to E1+Δ (i.e., the size of AF step) after the first AF step, the position of the carrier becomes α (i.e., tilt×Δ).

Next, if the encoder value of the third AF step is set to E1+2Δ, the position of the carrier becomes 2α. In the same manner, every time the encoder value of the AT step is increased by Δ, the position of the carrier moves as much as α. By processing up to the last AF step in this way, the AF is completed.

In FIG. 6B, for this particular exemplary embodiment it shall be assumed that the initial value of the encoder of the driving unit is E2, unlike the encoder initial value of the driving unit in FIG. 6A. Similar to FIG. 6A, since the encoder initial value of the corresponding driving unit can be known before starting AF, the encoder value of the first AF step is set to E2. As a result, the position of a carrier is 0 as illustrated in the graph. That is, the driving unit does not drive until the encoder value becomes E2.

Still referring to FIG. 6B, if the encoder value of the second AF step is set to E2+Δ (i.e., the size of AF step) after the first AF step, the position of the carrier becomes α (i.e., tilt×Δ).

Next, if the encoder value of the third AF step is set to E2+2Δ, the position of the carrier becomes 2α. In the same manner, every time the encoder value of the AT step is increased by Δ, the position of the carrier moves by as much as α. In this way, when the last AF step is processed, the AF is completed. In the present invention, a process of performing AF by using the encoder initial value is illustrated in the flowchart of FIG. 7 below.

Figure 7:
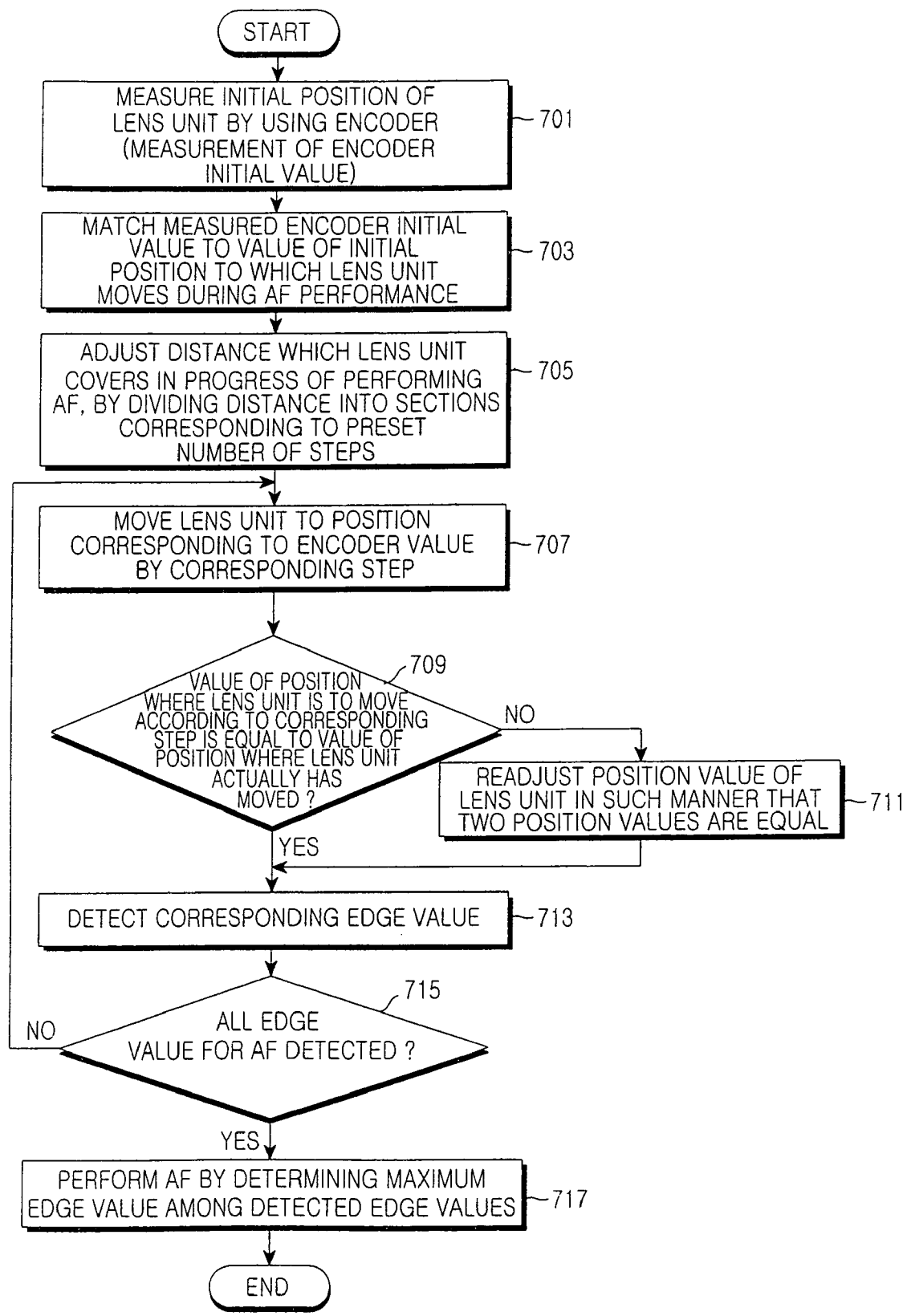
FIG. 7 is a flowchart illustrating an example of a process for performing the auto focus of the auto focus camera using the initial value of the encoder according to an exemplary embodiment of the present invention.

FIG. 7 illustrates a flowchart showing a process of performing the auto focus of the auto focus camera using the initial value of the encoder according to an exemplary embodiment of the present invention.

Referring to FIG. 7, in step 701, the initial position of the lens unit is detected by using an encoder. The detected initial position value of the lens unit corresponds to an encoder initial value. In step 703, the measured encoder initial value is matched to the initial position value of the lens unit, that is, a position where the lens unit starts to move for the first time.

Step 703 prevents an unnecessary step by matching the encoder initial value to the starting point of the first AF step. Next, in step 705, the ISP adjusts the distance, which the lens unit will cover in progress of performing AF, by dividing the distance into sections corresponding to the preset number of steps by using the encoder initial value. In step 707, the control unit moves the lens unit to the position corresponding to the encoder value of the corresponding step transmitted from the ISP.

In step 709, the control unit compares the value of the position where the lens unit is to supposed move according to the corresponding step with the value of the position where the lens unit actually has moved. If both the values are equal, the control unit proceeds to step 713 and detects the corresponding edge value. If not, the control unit proceeds to step 711 and readjusts the value of the position where the lens unit has actually moved, on the basis of the position value detected by the ISP, such that the encoder value detected by the ISP and the readjusted position value of the lens unit are equal, and then proceeds to step 713 and detects the corresponding edge value.

In step 715, the processes from step 707 to step 713 are repeatedly executed until all the edge values necessary for the AF are detected. When all the edge values are detected, the control unit proceeds to step 717 and performs the AF without generating the unnecessary step by determining the maximum edge value among the detected edge values.

As described above, it is possible to always set the position of the lens unit of the first AF step to "0" and the position of the lens unit of the second AF step to "α" according to the encoder initial value instead of existing edge value. That is, the AF steps are performed at a certain position irrespective of the different VCM driving current value according to the driving unit so that the AF driving time can be reduced.

Therefore, according to the present invention, in an auto focus apparatus and method for a camera, it is possible to prevent the waste of auto focus steps by setting the starting point of the auto focus of the driving unit to "0" through use of the encoder initial value and by performing the first auto focus step at a certain position regardless of the different VCM driving current value according to the driving unit. At least one advantage is the ability set the minimum number of the auto focus steps. Accordingly, the present invention has an effect that it can reduce the auto focus driving time.

As described above, a structure and operation of an apparatus and method for an auto focus of a camera according to preferred exemplary embodiments of the present invention can be made. While the invention has been shown and described with reference to certain exemplary embodiments thereof, it will be understood by those skilled in the art that various changes in form and details may be made therein without departing from the spirit and scope of the invention as defined by the appended claims. For example, while a Hall sensor and a magnet are disclosed as comprising the encoder, it should be understand that other types of sensors/sensing devices (such as optical) could be used and are within the spirit and scope of the invention.

What is claimed is:

1. An auto focus method in a camera, the method comprising the steps of:
   detecting, by an encoder, an encoder initial value corresponding to a driving current value required for a lens unit to start to initially move and receiving the encoder initial value by an image signal processor, wherein the encoder initial value is one of encoder values corresponding to a position being equal to where the lens unit starts to initially move as a starting point of an auto focus operation, and each of the encoder values corresponds to a position value by which the lens unit is to be moved;
   performing the auto focus operation by starting from the detected encoder initial value, and dividing a distance that the lens unit is to be moved into sections corresponding to a preset number of steps;
   comparing a position value by which the lens unit is to be moved in each step of the preset number of steps with a position value by which the lens unit has actually moved in said each step;
   detecting an edge value that shows a brightness change for a contour of a subject in said each step; and
   completing the auto focus operation by moving the lens unit to a position corresponding to the edge value having a maximum brightness change for the contour of the subject selected from among the edge values detected for the preset number of steps.

2. The auto focus method of claim 1, wherein a Hall sensor is used for the measuring of the initial position of the lens unit by the encoder.

3. The autofocus method of claim 2, wherein the encoder initial value is not a fixed value and is based on a respective VCM driving current.

4. The auto focus method of claim 2, wherein for a plurality of lens units, encoder initial values are detected according to a locking type and locking position of each respective lens unit.

5. The auto focus method of claim 1, wherein the auto focus operation is not performed until a driving current value corresponds to the encoder initial value.

6. The auto focus method of claim 1, wherein in detecting edge values for as many as the number of said preset number of steps, detecting each edge value for adjusting the position value, in which the lens unit has actually moved during each step of said preset number of steps is linearized while performing in regular sequence from a first step of said preset number.

7. The auto focus method of claim 6, wherein when adjusting the position value of the lens unit to be linearized, an edge value is detected by linearly readjusting the position of the lens unit so that a scaling factor of the position value by which the lens unit is to move according to a corresponding step of the position value by which the lens unit has actually moved is "1".

8. An auto focus apparatus for a camera, the apparatus comprising:
an encoder for detecting an encoder initial value corresponding to a driving current required for a lens unit to start to initially move, wherein encoder initial value is one of encoder values corresponding to a position being equal to from where the lens unit starts to move as a starting point of an auto focus operation, and each of the encoder values corresponds to a position value by which the lens unit is to be moved;
an image signal processor for receiving the encoder initial value, and equally adjusting a distance by which the lens unit is to move, by dividing the distance into a certain number of steps during the auto focus operation; and
a control unit for comparing a position value by which the lens unit is to be moved in each step with a position value by which the lens unit has actually moved in said each step, adjusting the position value of the lens unit by which the lens unit has actually moved in said each step.

9. The auto focus apparatus of claim 8, wherein said control unit performing linear adjustment of the position value.

10. The auto focus apparatus of claim 8, wherein the control unit comprises:
a feedback control circuit for linearly readjusting the position of the lens unit so that a scaling factor of the position value by which the lens unit is to move according to a corresponding step of the position value of the lens unit by has actually moved is "1"; and
a driver for moving the lens unit by controlling a motor of a driving unit which receives the position value of the lens unit readjusted by the feedback control circuit and moves the lens unit.

11. The auto focus apparatus of claim 8, wherein the driving unit further comprises a carrier for moving the lens unit forward and backward along an optical axis by a driving force of the voice coil motor.

12. The auto focus apparatus of claim 8, wherein the encoder comprises a sensor for detecting a position change of the lens unit.

13. The autofocus apparatus of claim 8, wherein the encoder comprises a Hall sensor and a magnet.

14. An autofocus (AF) camera comprising:
a lens unit comprising at least one lens for forming an image of a subject;
an image sensor for detecting the image formed by the lens unit and providing the detected image in the form of an electric signal,
an image signal processor (ISP) for processing the image signal transmitted from the image sensor frame by frame and for converting the image signal according to at least one predetermined screen characteristic,
a driving unit for driving the lens unit along the optical axis, said driving unit including a carrier;
a control unit for controlling the driving unit, and
an encoder for detecting an encoder initial value corresponding to a driving current required for a lens unit to start to initially move, wherein encoder initial value is one of encoder values corresponding to a position being equal to from where the lens unit starts to move as a starting point of an auto focus operation, and each of the encoder values corresponds to a position value by which the lens unit is to be moved;
wherein the image signal processor being configured for receiving the encoder initial value from the encoder, and for equally adjusting a distance by which the lens unit is to move, by dividing the distance into a predetermined number of steps during the auto focus operation; and
wherein said control unit being configured for comparing a position value by which the lens unit is to be moved in each step with a position value by which the lens unit has actually moved in said each step, for adjusting the position value of the lens unit by which the lens unit has actually moved in said each step.

15. The camera according to claim 14, wherein said control unit linearly adjusting the position value.

16. The camera according to claim 14, wherein the encoder comprises a sensor for detecting a position change of the lens unit.

17. The camera according to claim 16, wherein the encoder comprises a Hall sensor, and wherein a magnet is attached to the carrier of the driving unit.

18. The camera according to claim 14, wherein the control unit comprises a feedback control circuit for receiving a value from the encoder of an actual travel distance of the lens unit by each step, including the encoder initial value, and wherein the feedback control circuit for comparing an encoder value received from the ISP with the value of actual travel distance of the lens unit, for generating a control signal for controlling the driving unit, and for linearizing the control signal by the addition and subtraction of the actual travel distance of the lens unit on the basis of the encoder value received from the ISP.

19. The camera according to claim 18, wherein the linearized control signal transmitted from the feedback control circuit is provided to a motor driver of the control unit for controlling the driving unit by linearly moving the position of the lens unit by each step.

\* \* \* \* \*